United States Patent
Bank et al.

(10) Patent No.: US 9,641,571 B2
(45) Date of Patent: *May 2, 2017

(54) ORCHESTRATION OF ELECTRONIC MEETINGS

(71) Applicant: International Business Machines Corporation, Armonk, NY (US)

(72) Inventors: Judith H. Bank, Morrisville, NC (US); Liam Harpur, Skerries (IE); Ruthie D. Lyle, Durham, NC (US); Patrick J. O'Sullivan, Ballsbridge (IE); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/893,557

(22) Filed: May 14, 2013

(65) Prior Publication Data

US 2014/0344349 A1    Nov. 20, 2014

(51) Int. Cl.
*H04L 29/06*    (2006.01)
*G06Q 50/00*    (2012.01)

(52) U.S. Cl.
CPC ......... *H04L 65/403* (2013.01); *G06Q 50/01* (2013.01)

(58) Field of Classification Search
CPC ............ H04L 65/403; H04L 12/1827; G06F 2212/00; G06F 3/04883; G06Q 10/1095
See application file for complete search history.

(56) References Cited

U.S. PATENT DOCUMENTS

| | | | | |
|---|---|---|---|---|
| 8,091,029 | B1* | 1/2012 | Gay et al. | 715/734 |
| 8,321,796 | B2* | 11/2012 | Lyle et al. | 715/753 |
| 2007/0100938 | A1* | 5/2007 | Bagley et al. | 709/204 |
| 2008/0034085 | A1* | 2/2008 | Chawla et al. | 709/224 |
| 2008/0040187 | A1 | 2/2008 | Carraher et al. | |
| 2008/0320082 | A1* | 12/2008 | Kuhlke et al. | 709/205 |
| 2010/0023849 | A1* | 1/2010 | Hakim | H04L 12/6418 715/202 |
| 2011/0264745 | A1* | 10/2011 | Ferlitsch | 709/205 |
| 2011/0307805 | A1* | 12/2011 | Bastide et al. | 715/753 |

(Continued)

OTHER PUBLICATIONS

IBM, "System and Method to Orchestrate Behavior in eMeetings," IP.com, IPCOM000173010D, Jul. 24, 2008, pp. 1-4.

(Continued)

*Primary Examiner* — Nicholas Taylor
*Assistant Examiner* — Afroza Sultana
(74) *Attorney, Agent, or Firm* — Brian J. Colandreo, Esq.; Jeffrey T. Placker, Esq.; Holland & Knight LLP

(57) ABSTRACT

A computer-implemented method, computer program product, and computing system is provided for orchestrating presentations within an electronic meeting. In an implementation, a method may include receiving one or more social scoring inputs associated with a plurality of presentations included within an electronic meeting. The method may also include defining a social score for a first presentation of the plurality of presentations based on, at least in part, the one or more social scoring inputs. The method may further include establishing at least one attribute of the first presentation for the electronic meeting based on the social score for the first presentation.

12 Claims, 8 Drawing Sheets

(56) References Cited

U.S. PATENT DOCUMENTS

2014/0136626 A1* 5/2014 Teevan .................. G09B 5/125
 709/205
2015/0193089 A1* 7/2015 Berlin .................. G06F 3/0481
 715/731

OTHER PUBLICATIONS

IBM, "Automatically Control eMeeting Presenters," IP.com, IPCOM000221322D, Sep. 4, 2012, pp. 1-3.

* cited by examiner

ORCHESTRATION OF ELECTRONIC MEETINGS

TECHNICAL FIELD

The present disclosure generally relates to systems and method for electronic meetings, and more particularly relates to orchestrating presentations within an electronic meeting.

BACKGROUND

Various collaboration systems exist for enabling individuals to engage in collaborate activities, such as working together on projects, sharing information, and the like. Collaboration systems can be particularly useful in allowing geographically dispersed individuals to interact with one another. Using different, or multi-functional, collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include receiving one or more social scoring inputs associated with a plurality of presentations included within an electronic meeting. The method may also include defining a social score for a first presentation of the plurality of presentations based on, at least in part, the one or more social scoring inputs. The method may further include establishing at least one attribute of the first presentation for the electronic meeting based on the social score for the first presentation.

One or more of the following features may be included. The one or more social scoring inputs may be received prior to the beginning of the electronic meeting. The one or more social scoring inputs may be received during the electronic meeting. The method may also include providing a presentation preview of at least a portion of the plurality of presentations. Further, receiving the social scoring inputs may be responsive to the presentation preview.

The at least one attribute may include a presentation order of the first presentation within the electronic meeting. The at least one attribute may include an allotted time for the first presentation within the electronic meeting. The allotted time may be established based on, at least in part, and available time interval for the first presentation.

According to another implementation, a computer program product includes a computer readable medium having a plurality of instructions stored on it. When executed by a processor, the instructions cause the processor to perform operations including receiving one or more social scoring inputs associated with a plurality of presentations included within an electronic meeting. Instructions may also be included for defining a social score for a first presentation of the plurality of presentations based on, at least in part, the one or more social scoring inputs. Instructions may further be included for establishing at least one attribute of the first presentation for the electronic meeting based on the social score for the first presentation.

One or more of the following features may be included. The one or more social scoring inputs are received prior to the beginning of the electronic meeting. The one or more social scoring inputs are received during the electronic meeting Instructions may also be included for providing a presentation preview of at least a portion of the plurality of presentations, and wherein receiving the social scoring inputs is responsive to the presentation preview.

The at least one attribute may include a presentation order of the first presentation within the electronic meeting. The at least one attribute may include an allotted time for the first presentation within the electronic meeting. The allotted time may be established based on, at least in part, and available time interval for the first presentation.

According to another implementation, a computing system may include at least one processor device and at least one memory architecture coupled with the at least one processor device. The at least one processor device configured for receiving one or more social scoring inputs associated with a plurality of presentations included within an electronic meeting. The at least one processor device may also be configured for defining a social score for a first presentation of the plurality of presentations based on, at least in part, the one or more social scoring inputs. The at least one processor device may further be configured for establishing at least one attribute of the first presentation for the electronic meeting based on the social score for the first presentation.

One or more of the following features may be included. The one or more social scoring inputs may be received prior to the beginning of the electronic meeting. The one or more social scoring inputs may be received during the electronic meeting. The at least one processor device may be further configured for providing a presentation preview of at least a portion of the plurality of presentations. Receiving the social scoring inputs may be responsive to the presentation preview.

The at least one attribute may include a presentation order of the first presentation within the electronic meeting. The at least one attribute may include an allotted time for the first presentation within the electronic meeting.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
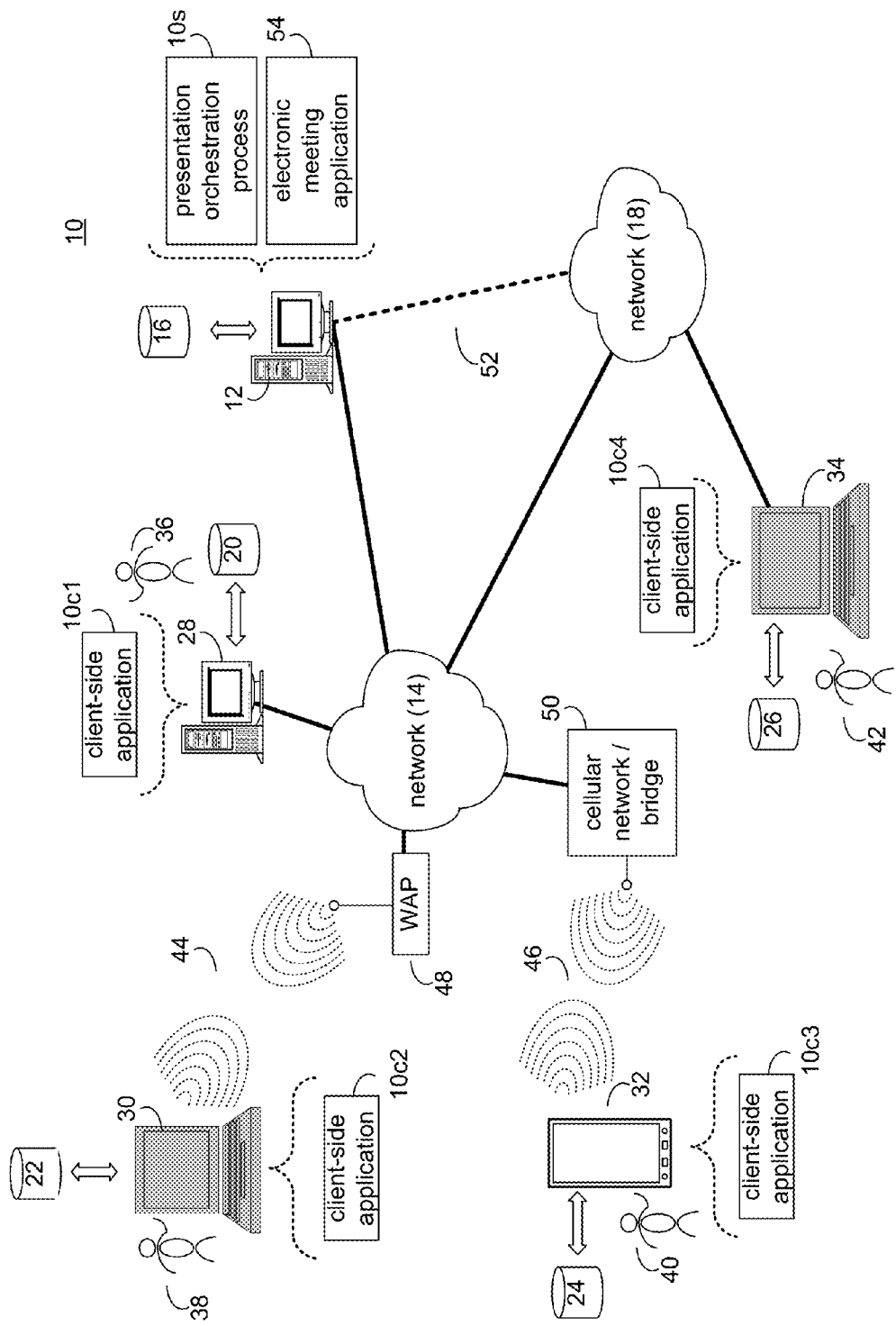
FIG. 1 is a diagrammatic view of a distributed computing network including a computing device that executes a presentation orchestration process according to an implementation of the present disclosure.

Electronic meetings can often provide a very convenient approach for sharing information among multiple individuals. Electronic meetings can further be useful when the individuals are geographically dispersed, such that is may not be feasible or cost effect to have the participants in the electronic meeting actual congregate for an in person meeting. Many times an electronic meeting may include more than one presentation, which may, for example, be given by different individuals and/or may relate to different topics or different aspects of a topic. Consistent with some embodiments of the present disclosure, systems and methods may be provided that may allow electronic meetings that include more than one presentation to be organized and delivered in response to social inputs of the meeting participants. For example, social inputs from the meeting participants may provide some indication as to the value that the meeting participants may place on different topics or presenters compared to one another. Further, in some situations, rather than providing an indication of a relative value that the participants place on different topics or presenters as compared to other topics or presenters, the social inputs may provide an indication of an objective value that the meeting participants may place on a given topic or presenter. In some situations, an electronic meeting may be orchestrated based on, at least in part, the social inputs provided by the meeting participants. For example, the order in which the various presentations are given during the electronic meeting may be based upon, at least in part, the social inputs from the meeting participants. In other examples, the time devoted to one or more of the presentations given during the electronic meeting may be based upon, at least in part, the social inputs provided by the meeting participants.

Electronic meetings including multiple presentations can often suffer from delays or inefficiencies that arise when one presentation ends and another presentation is started. Such delays or issues may result from poorly coordinated hand-offs between a current presenter and the next presenter, technical issues, such as delays or lag transferring control of the meeting between presenters, or delays in cuing up then next presentation in the electronic meeting. Consistent with some embodiments, the present disclosure may facilitate transitions between presentations. For example, in some situations, once the order of presentations within the electronic meeting has been established, either by a moderator or by social inputs from the meeting attendees, when one presentation ends and another presentation is to begin, control of the electronic meeting may automatically be transferred from a current presenter to the next presenter, e.g., based on the system's knowledge of the order in which the presentations are to occur (and who the presenters will be) during the electronic meeting. In some embodiments, transitions between presentations may be facilitated by pre-loading, or cuing-up, the next presentation, before control of the electronic meeting is handed over to the next presenter. For example, in some embodiments, prior to a presentation beginning, at least a portion of the slides or media associated with the presentation may be cached on an electronic meeting server and/or on local computing devices associated with the various meeting attendees. In such an embodiment, lags that may be associated with participants actually receiving the first slide or piece of media associated with a presentation may be reduced or eliminated, thereby further facilitating transitions between presentations within an electronic meeting. It will be appreciated that various additional/alternative features may also be provided consistent with the present disclosure.

Referring to FIG. 1, there is shown presentation orchestration process 10. For the following discussion, it is intended to be understood that presentation orchestration process 10 may be implemented in a variety of ways. For example, presentation orchestration process 10 may be implemented as a server-side process, a client-side process, or a server-side/client-side process.

For example, presentation orchestration process 10 may be implemented as a purely server-side process via presentation orchestration process 10$s$. Alternatively, presentation orchestration process 10 may be implemented as a purely client-side process via one or more of client-side application 10$c1$, client-side application 10$c2$, client-side application 10$c3$, and client-side application 10$c4$. Alternatively still, presentation orchestration process 10 may be implemented as a server-side/client-side process via screen presentation orchestration process 10$s$ in combination with one or more of client-side application 10$c1$, client-side application 10$c2$, client-side application 10$c3$, and client-side application 10$c4$. In such an example, at least a portion of the functionality of presentation orchestration process 10 may be performed by presentation orchestration process 10$s$ and at least a portion of the functionality of presentation orchestration process 10 may be performed by one or more of client-side application 10$c1$, 10$c2$, 10$c3$, and 10$c3$.

Accordingly, presentation orchestration process 10 as used in this disclosure may include any combination of presentation orchestration process 10$s$, client-side application 10$c1$, client-side application 10$c2$, client-side application 10$c3$, and client-side application 10$c4$.

Figure 2:
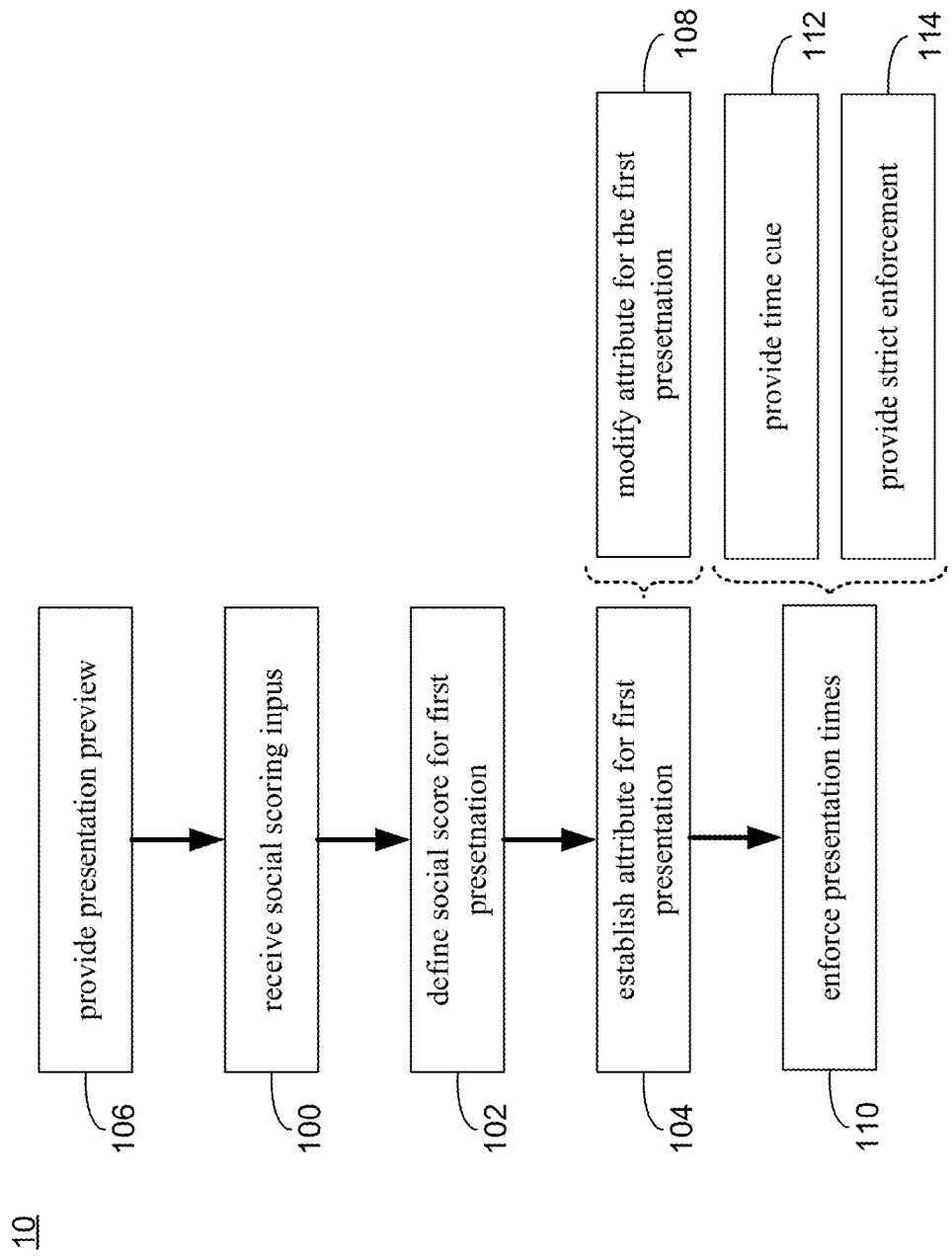
FIG. 2 is a flowchart of the presentation orchestration process of FIG. 1, according to an implementation of the present disclosure.

Referring also to FIG. 2, and as will be discussed in greater detail below, presentation orchestration process 10 may receive 100 one or more social scoring inputs associated with a plurality of presentations included within an electronic meeting. presentation orchestration process 10 may also define 102 a social score for a first presentation of the plurality of presentations based on, at least in part, the one or more social scoring inputs. presentation orchestration process 10 may further establish 104 at least one attribute of the first presentation for the electronic meeting based on the social score for the first presentation.

presentation orchestration process 10$s$ may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of presentation orchestration process 10$s$, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access presentation orchestration process 10 directly through network 14 or through secondary network 18. Further, screen capture process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, presentation orchestration process 10 may communicate with, interact with, and/or include a component or module of an electronic meeting application, web conferencing application, or similar application (e.g., electronic meeting application 54). As is generally know, an electronic meeting application (e.g., electronic meeting application 54) may generally facilitate electronic meetings, for example by permitting audio, video, and/or other media exchanges between the meeting participants and/or broadcast of audio, video, and/or other media from one or more meeting participants (e.g., presenters) to one or more other meeting participants. For example, electronic meeting application 54 may allow one or more of voice communications, video communications, text-based messages, media exchanges (e.g., sharing and/or viewing of text documents, slide shows, audio and video media), and/or communication and/or consumption of electronic content amongst participants in an electronic meeting.

In an embodiment, the instruction sets and subroutines of electronic meeting application 54 may be stored, e.g., on storage device 16 associated with server computer 12, which executes electronic meeting application 54, and/or another suitable storage device. Further, users (e.g., one or more of users 36, 38, 40, 42) may access electronic meeting application 54 in order to participate in an electronic meeting (e.g., for presenting during the electronic meeting and/or for consuming one or more presentations). The users may access electronic meeting application 54 via one or more suitable applications, such as client side applications 10c1-10c4 (e.g., which may include a web browser, a client electronic meeting application or another application) and/or via a different application (not shown). As generally discussed above, a portion and/or all of the functionality of presentation orchestration process 10 may be provided by one or more of client side applications 10c1-10c4. For example, in some embodiments presentation orchestration process 10 (and/or client-side functionality of presentation orchestration process 10) may be included within and/or interactive with client-side applications 10c1-10c4, which may include client side electronic meeting applications, web browsers, or another application. Various additional/alternative configurations may be equally utilized.

As generally discussed above with reference to FIG. 2, presentation orchestration process 10 may receive 100 one or more social scoring inputs associated with a plurality of presentations included within an electronic meeting. presentation orchestration process 10 may also define 102 a social score for a first presentation of the plurality of presentations based on, at least in part, the one or more social scoring inputs. presentation orchestration process 10 may further establish 104 at least one attribute of the first presentation for the electronic meeting based on the social score for the first presentation. It will be understood that in some circumstances the term "first presentation" may indicate a first one of a plurality of presentations without necessarily indicating an order in which the presentation may occur in an electronic meeting.

For example, in some situations an electronic meeting may include more than one presentation that may be presented during the course of the electronic meeting. The plurality of presentations may include different presentations that are given by a single presenter, or may include different presentations that are given by two or more different presenters. Presentation orchestration process 10 may receive 100 one or more social scoring inputs associated with the plurality of presentations that may be included within the electronic meeting. In various embodiments, the received 100 social scoring inputs may include, for example, votes, preferences, objective ranking, comparative ranking, like/dislike indication, or some other input that may be received 100 from one or more of the meeting participants associated with one presentation, a portion of the presentations, or all of the presentations (and/or presenters) that may be included within an electronic meeting. In some embodiments, social scoring of the presentations and/or presenters by the participants of the electronic meeting may be leveraged to guide behaviors or structure of the electronic meeting. In some embodiments, the electronic meeting may be completely guided by social scoring inputs. In other embodiments, the electronic meeting may be at least partially guided by a moderator and/or rules, preferences, or default behaviors established for electronic meeting application 54.

Figure 3:
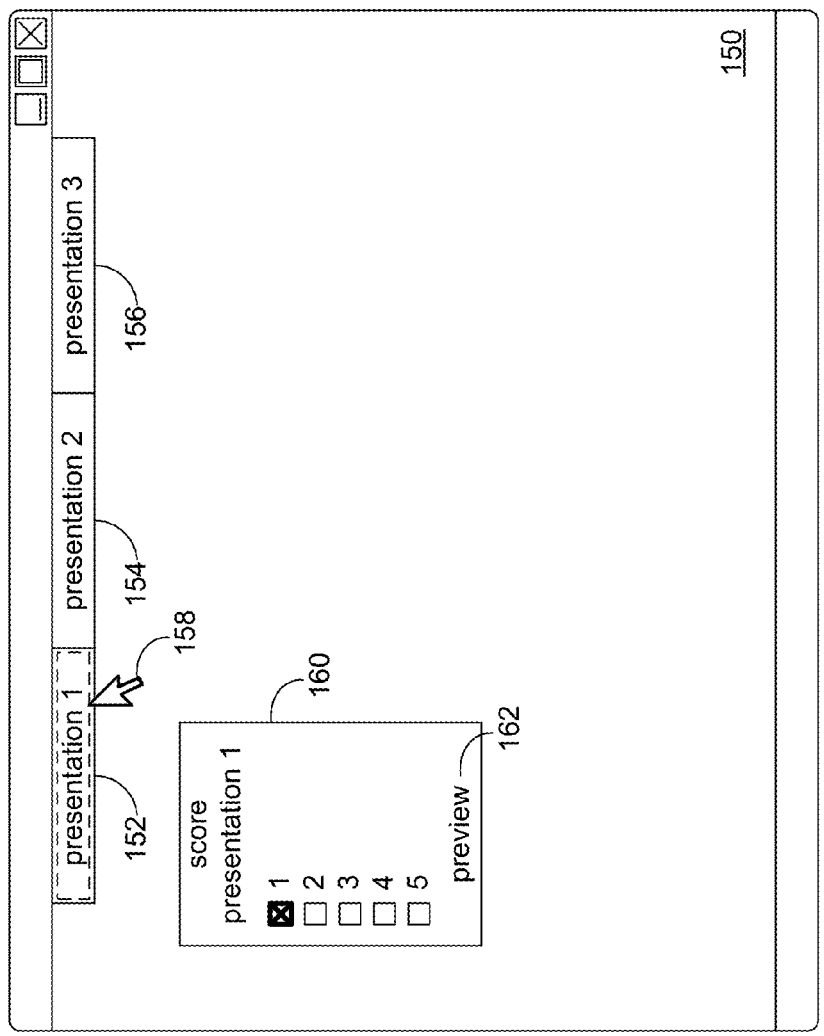
FIG. 3 is diagrammatic representation of an example presentation orchestration process of FIG. 1, according to an implementation of the present disclosure.

For example, and referring also to FIG. 3, in an embodiment, the various presentations that may be included within an electronic meeting may be preregistered with electronic meeting application 54. For example, a moderator who may organize the meeting may define a meeting itinerary including three presentations that may occur during the electronic meeting. In some embodiments, the moderator may provide an initial order in which the three presentations may occur during the electronic meeting, a time duration associated with each presentation, an identification of the presenter of each presentation, and/or various other information regarding the presentations that may be included within the electronic meeting and/or information regarding the electronic meeting in general. The registered presentations may be displayed to participants of the electronic meeting, for example, in electronic meeting interface 150, which may be provided by, e.g., electronic meeting application 54 (e.g., via a client-side application, such as client application 10c1). For example, as shown in FIG. 3, each registered presentation (e.g., presentation 1, presentation 2, and presentation 3) that may be included within the electronic meeting may be presented as a respective tab (e.g., tabs 152, 154, 156) within electronic meeting interface. In some embodiments, the registered presentations may be otherwise displayed, for example, in an electronic meeting invitation, itinerary, etc.

A user (e.g., user 36 operating client application 10c1) may provide a social scoring input associated with one or more of the plurality of presentations. For example, user 36 may select tab 152, associated with presentation 1, using onscreen pointer 158, a touch input device, or other suitable selection mechanism. In response to user 36 selecting tab 152, presentation orchestration process 10 (alone and/or in conjunction with one or more other processes or applications) may provide a social scoring input menu. In an embodiment, a social scoring input menu (e.g., social scoring input menu 160) may include scoring options, e.g., which may allow user 36 to select a desired score for presentation 1 on a scale between one and five. For example, user 36 may select (e.g., via onscreen pointer 158, or other input device) a radio button associated with a desired score for presentation 1 on the scale from one to five. In response to user 36 selecting a desired score for presentation 1 (e.g., a score of one in the illustrated example), presentation orchestration process 10 may receive the social scoring input, including a score of one associated with presentation 1, from user 36 (e.g., via client application 10c1, or another processor or application). While not shown, social scoring input menu 160 (and/or another menu, dialog box, etc.) may include information regarding the selected presentation (and/or one or more additional presentations). For example, the information regarding the presentation may include a presentation title, a presenter name, a presentation summary or topic, or other information regarding the selected presentation (and/or one or more other presentations) that may provide the user with some basis for providing the social scoring input.

Presentation orchestration process 10 may receive 100 one or more social scoring inputs associated with the plurality of presentations that may be included within the electronic meeting, including various additional and/or alternative social scoring inputs. For example, in an embodiment, a social scoring input may include an arrangement of the presentations in order from most desired/anticipated to least desired anticipated, for example, using a suitable menu, by dragging and dropping tabs 152, 154, 156 into a desired order, or via other suitable arrangement mechanism. In an embodiment, a social scoring input may include a vote cast for a most preferred, anticipated, etc., presentation from among the plurality of presentations that may be included within the electronic meeting. Such a vote may be cast using a suitable voting mechanism. Other examples of social scoring inputs that may be received 100 by presentation orchestration process 10 may include, for example, a "like" or "dislike" input associated with one or more of the plurality of presentations, as well as any other input that may indicate a relative preference for one or more presentation as compared to one or more other presentation, and/or an object preference for one or more of the presentations.

In an embodiment, the one or more social scoring inputs may be received 100 prior to the beginning of the electronic meeting. For example, an indicator of the plurality of presentations that may be included within the electronic meeting may be provided to at least a portion of the meeting participants prior to the beginning of the first presentation and/or prior to the beginning of the electronic meeting. For example, an indicator of the plurality of presentations may be included in an invitation to the electronic meeting, in an itinerary associated with the electronic meeting, and/or via an electronic meeting interface (e.g., electronic meeting interface 150 depicted in FIG. 3). Consistent with such an embodiment, presentation orchestration process 10 may receive 100 social scoring inputs association with the plurality of presentations to be included within the electronic meeting prior to the beginning of the electronic meeting.

In an embodiment, the one or more social scoring inputs may be received 100 during the electronic meeting. For example, the one or more social scoring inputs 100 may be received 100 while the electronic meeting is taking place, e.g., while one of the plurality of presentations is being presented, and/or after one or more of the plurality of presentations have been completed. In such an embodiment, presentation orchestration process 10 may receive 100 real-time and/or near real-time feed back regarding one or more of the presentations and/or regarding the electronic meeting in general. In some embodiments, receiving 100 social scoring inputs may allow dynamic orchestration of one or more of the presentations included within the electronic meeting, as will be discussed in greater detail below. Further in some embodiments, social scoring inputs may be received relative to one or more of the plurality of presentations both before the electronic meeting (and/or before the one or more presentations) begins as well as during the course of the electronic meeting (and/or during the course of the one or more presentations).

In some embodiments, the social scoring input received 100 during the electronic meeting may be received for one or the presentations (e.g., a first presentation) included within the electronic meeting during the course of the first presentation. For example, as shown in FIG. 3 a presentation that is currently being presented during the course of the electronic meeting may be graphically indicated (e.g., as shown with respect to tab 152). In some embodiments, the social scoring input received 100 during the course of the first presentation may include social scoring input that is in addition to a social scoring input that may have been received 100 for the first presentation prior to the first presentation beginning. As such, the social scoring input received 100 during the course of the first presentation may represent a revision of the social scoring input received before the beginning (and/or at an earlier point during) the first presentation.

Figure 4:
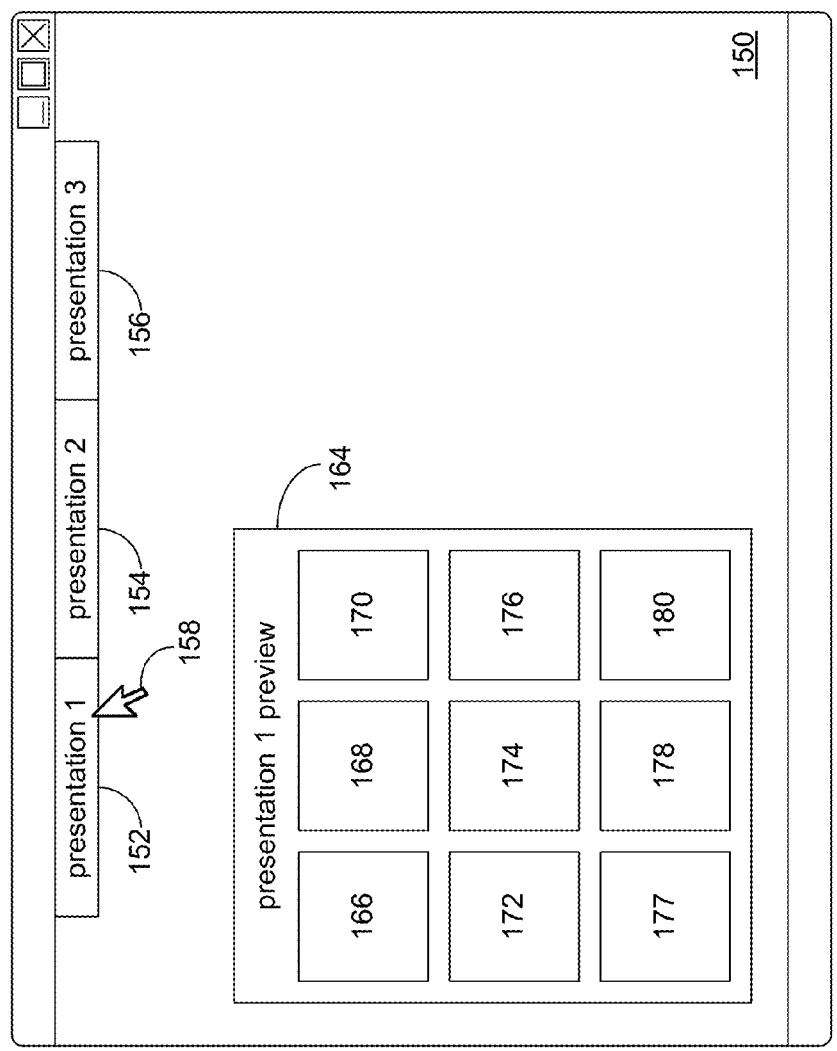
FIG. 4 is a diagrammatic representation of an example presentation orchestration process of FIG. 1, according to an implementation of the present disclosure.

In some embodiments, as generally discussed above, in some embodiments information may be provided to a user regarding one or more of the presentations, which may provide a basis for a social scoring input by the user. In addition/as an alternative to the previously discussed information, in an embodiment presentation orchestration process 10 (alone and/or in conjunction with one or more other processor or applications) may provide 106 a presentation preview of at least a portion of the plurality of presentations. For example, to facilitate providing a social scoring input user 36 may select preview option 162 from within social scoring input menu 160. Referring also to FIG. 4, in response to user 36 selecting preview option 162 (and/or making other suitable selection or request), presentation orchestration process 10 may provide 106 presentation preview 164 of at least a portion of the plurality of presentations. Preview 164 may include, for example, one or more slides (e.g., slides 166-180) which may be included in a slide show associated with at least one of the presentations that may be included within the electronic meeting. Additionally/alternatively, preview 164 may include information such as a presentation title, a presentation topic or summary, a presenter name, or other information. Presentation preview 164 may, for example, provide the user with additional information and/or context that may facilitate the user providing a social scoring input regarding one or more of the presentations that may be included within electronic meeting. In such a situation, receiving 100 the one or more social scoring inputs may be response to the presentation preview.

Presentation orchestration process 10 may also define 102 a social score for a first presentation of the plurality of presentations based on, at least in part, the one or more social scoring inputs. In an embodiment, presentation orchestration process 10 may define 102 a social score for the first presentation that may include an aggregation of the social scoring inputs received 100 from various users for the first presentation. For example, if the social scoring input includes a "like" or "dislike" designation or simply the occurrence of a vote for the first presentation, the aggregation of the social scoring inputs may include a tally of the number of "like" or "dislike" designations and/or the number of votes received for the first presentation. In some embodiments, for example in which the social score input may include a score on a scale, a comparative ranking (e.g., as compared to one or more other presentation), or the like, aggregating the received 100 social scoring inputs to define 102 a social score for the first presentation may include determining an average score, ranking, or the like. Similar social scores may be defined 102 utilizing suitable aggregation techniques depending upon the received 100 social scoring input.

In an embodiment in which social scoring inputs may be received 100 prior to the beginning of the electronic meeting (and/or prior to the beginning of the first presentation) and may be received 100 during the course of the meeting (and/or during the course of the first presentation), presentation orchestration process 10 may define 102 a social score for the first presentation that may include an initial social score and a revised social score. The initial social score and the revised social score may respectively correspond to social scoring inputs received 100 prior to the beginning of the electronic meeting (and/or prior to the beginning of the first presentation) and to social scoring inputs received 100 during the course of the first electronic meeting (and/or during the course of the first electronic meeting). In some embodiments, presentation orchestration process 10 may define a social score for the first presentation that may include a combination of the initial social score and the revised social score. In a situation in which the social score includes a combination of an initial social score and a revised social score, the initial social score and the revised social score may be combined in a variety of manners, for example utilizing various weighting techniques, e.g., based on a number of received inputs associated with each of the initial social score and the revised social score, based on a weighting factor associated with one or more of the initial social score and the revised social score, and/or according to various different techniques.

In some embodiments, the social score for the first presentation may be indicative of a threshold number of received 100 social scoring inputs. In some embodiments, the social score for the first presentation may be indicative of a threshold social score value (e.g., a threshold score, rank, value, etc.). In some embodiments, the social score for the first presentation may include an absolute score. In some embodiments, the social score may include a relative social score (e.g., relative to at least a second presentation of the plurality of presentations).

Presentation orchestration process 10 may further establish 104 at least one attribute of the first presentation for the electronic meeting based on the social score for the first presentation. Attributes of the first presentations (and/or of others of the plurality of presentations included within the electronic meeting) may include any characteristic, or combination of characteristics, of the first presentation, of the first presentation with respect to one or more other presentations, and/or of the first presentation with respect to the electronic meeting. As such, the electronic meeting participants may influence the structure, arrangement, organization, progress, etc., of the electronic meeting by providing social scoring inputs regarding one or more of the plurality of presentations included within the electronic meeting. That is, the social scoring inputs from the electronic meeting participants may be received 100 by presentation orchestration process 10, which may further define 102 a social score for one or more of the presentations, and may also establish 104 at least one attribute for at least one of the presentations based on the defined 102 social score.

As generally discussed above, in some embodiments, presentation orchestration process 10 may receive 100 social scoring inputs prior to the beginning of the electronic meeting (and/or the beginning of the first presentation) and/or may receive 100 social scoring inputs during the course of the electronic meeting (and/or during the course of the first presentation). Accordingly, in some embodiments, presentation orchestration process 10 may establish 104 at least one attribute for the first presentation before the electronic meeting and/or during the course of the electronic meeting. As such, in some embodiments presentation orchestration process 10 may establish 104 attributes of the first presentation (and/or of other presentations that may be included within the electronic meeting) dynamically (e.g., in real-time or near real-time) during the course of the meeting. Further, presentation orchestration process 10 may modify 108 the at least one attribute for the first presentation, e.g., based on subsequently received 100 social scoring inputs and/or may modify 108 the at least one attribute for the first presentation, e.g., relative to a previously established attribute for the first presentation.

The at least one attribute may include a presentation order of the first presentation within the electronic meeting. In an embodiment presentation orchestration process 10 may establish 104 a presentation order attribute associated with the first presentation based on, at least in part, a social score defined 102 for the first presentation. For example, presentation orchestration process 10 may receive 100 social scoring inputs for the first presentation (and/or for other presentations to be included within the electronic meeting) that may be indicative of a level of interest of the meeting participants in the first presentation. Based on the received 100 social scoring inputs, presentation orchestration process 10 may establish a presentation order attribute for the first presentation based on a level of interested in the first presentation by the electronic meeting participants, as reflected by the received 100 social scoring inputs from the electronic meeting participants.

Figure 5:
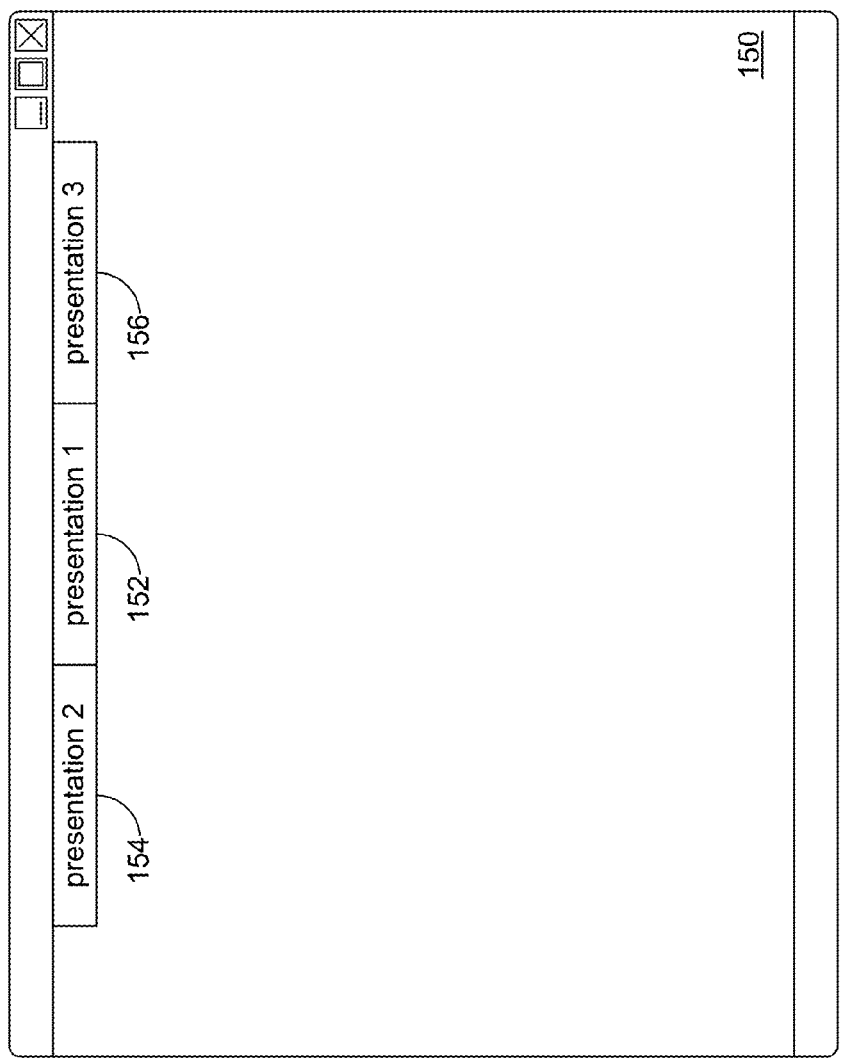
FIG. 5 is a diagrammatic representation of an example presentation orchestration process of FIG. 1, according to an implementation of the present disclosure.

As generally discussed above, in an embodiment, the social score for the first presentation (e.g., as well social scores for others of the plurality of presentations) may include a relative social score. In the context of the foregoing example, the social score defined 102 for the first presentation may indicate a level of interest in the first presentation by the meeting participants as compared to a level of interest for one or more other presentations by the meeting participants. In an embodiment, presentation orchestration process 10 may establish 104 an attribute for the first presentation that may include an order during the electronic meeting in which the first presentation may be presented. In an embodiment, as shown in FIG. 5, the current order in which the presentations will be presented during the electronic meeting may be displayed in electronic meeting user interface 150, e.g., as reflected by the order of tabs 152, 154, 156. As shown in the illustrated embodiment, presentation orchestration process 10 may establish 104 an attribute for the first presentation (indicated in tab 152) whereby presentation 1 may be presented after presentation 2 and before presentation 3. Accordingly, electronic meeting participants may influence the order in which presentations may be presented during the electronic meeting based on provided social scoring inputs indicating a level of interest in each, or in at least one, presentation to be included within the electronic meeting. Further, by displaying the current order in which the presentations will be presented (e.g., via tabs 152, 154, 156, or via some other suitable indicator), meeting participants may be motivated to provide a social scoring input if they have a presentation order preference that is different than the current presentation order.

In some embodiments, establishing 104 a presentation order attribute for the first presentation (and or establishing 104 a presentation order attribute for the first presentation that is different than a presentation order attribute assigned by a meeting moderator or system default) may require a threshold social score and/or threshold number of received 100 social scoring inputs. For example, it may be desirable to change an order of the presentations within the electronic meeting (e.g., as compared to an initially established order of the presentations) if a significant number of electronic meeting participants express a preference for one presentation over another and/or express an interest in changing the order of the presentations. As such, establishing 104 a presentation order attribute that is different than a default and/or previously established presentation order may require a certain threshold social score and/or number of social scoring inputs indicative of a sufficient desired by the electronic meeting attendees to change the presentation order. Such thresholds may be determined by system preferences, rules, moderator settings, or the like.

The at least one attribute may include an allotted time for the first presentation within the electronic meeting. For example, in addition/as an alternative establishing a presentation order based on a defined 102 social score for the first presentation, presentation orchestration process 10 may establish 104 an allotted time for the first presentation based on the defined 102 social score for the presentation. As generally discussed, in some situations the social score (and/or the social scoring inputs) may be indicative of a level of interest in the first presentation (and/or other presentations included within the electronic meeting) by the electronic meeting participants. Accordingly, presentation orchestration process 10 may establish an allotted presentation time attribute for the first presentation that may be indicative of a level of electronic meeting participant interest in the first presentation (and/or in other presentations included within the electronic meeting). In some embodiments, a greater amount of time may be allotted to presentations for which electronic meeting participants have expressed a greater interest. Additionally/alternatively, a lesser amount of time may be allotted to presentations for which electronic meeting participants have express a lesser interest. In some embodiments, allotted presentation time increases and/or decreased may be compensated for, e.g., by corresponding increases and/or decreased in the allotted presentation times of other presentations included within the electronic meeting (e.g., to adhere to a scheduled total time for the electronic meeting). As generally discussed above with respect to establishing 104 a presentation attribute including a presentation order, in some embodiments establishing 104 a presentation attribute including an allotted time for the first presentation may be based on, at least in part, a threshold social score and/or number of received social scoring inputs, e.g. to merit establishing 104 a presentation allotted time that is different than a default and/or moderator established presentation allotted time.

Figure 6:
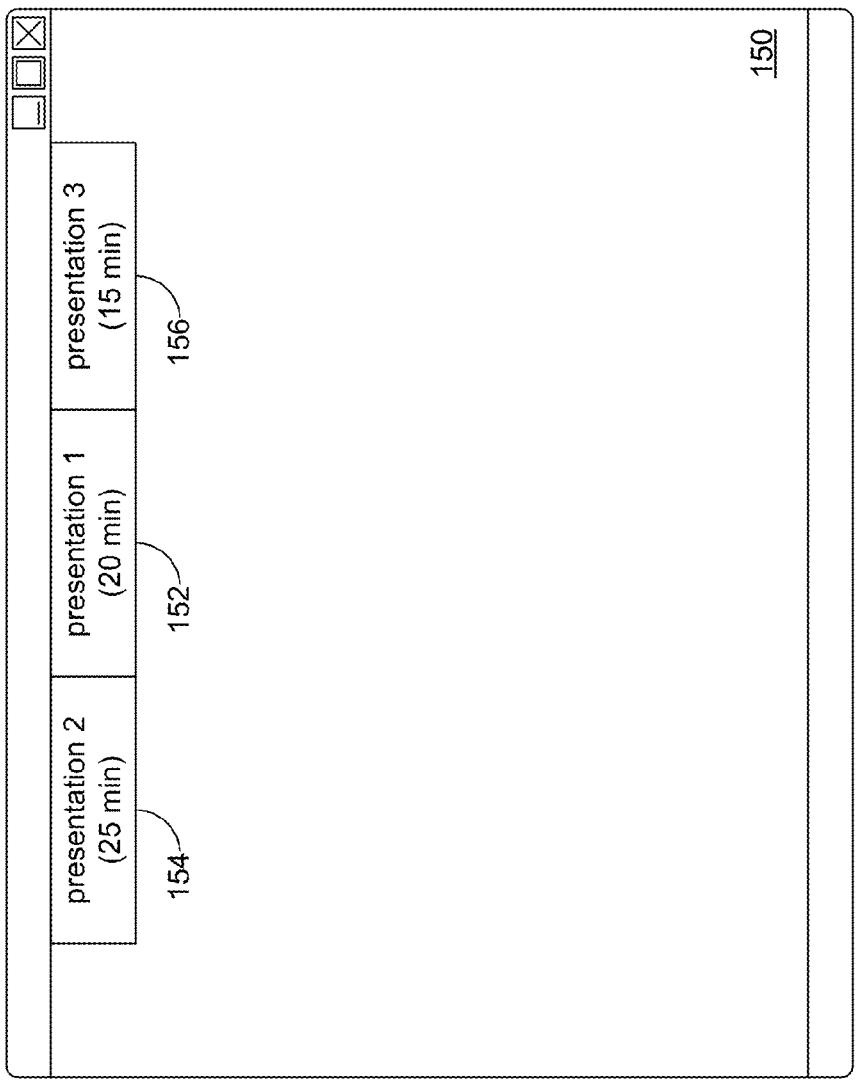
FIG. 6 is a diagrammatic representation of an example presentation orchestration process of FIG. 1, according to an implementation of the present disclosure.

In some embodiments presentation orchestration process 10 may provide a visual indicator of an allotted presentation time associated with each presentation that may be included within the electronic meeting. For example, and referring also to FIG. 6, in some embodiments, tabs 152, 154, 156, which may in some embodiments indicate the presentations included within the electronic meeting, and the order that the presentations will be presented during the electronic meeting, may also include an indicator of the allotted time associated with each presentation that may be included within the electronic meeting. For example, as shown tab 154 may indicate that presentation 2 may be presented first during the electronic meeting, and may have an allotted presentation time of 25 minutes. Similarly, tab 152 may indicate that presentation 1 may be presented second during the electronic meeting, and may have an allotted presentation time of 20 minutes. Further, tab 156 may indicate that presentation 3 may presented third during the electronic meeting and may have an allotted presentation time of 15 minutes. Various additional and/or alternative mechanisms may be utilized for communicating allotted presentation times associated with each presentation to the electronic meeting participants. In some situations, presentation orchestration process 10 may provide the indicator of the allotted presentation time associated with each presentation, whereby the indicator may motivate the electronic meeting participants to provide social scoring inputs, e.g., to ensure that a greater amount of time is allotted to presentations that are of interest to the electronic meeting participants.

In order to allow presenters to adequately plan and prepare the presentations, it may be desirable to provide If allotted presentation times are established for each presentation as a proportion of total electronic meeting time based on social score, there may be a wide variation in possible presentation times that may be allotted. For example, if one presentation received a very high defined social score and the remaining presentations received very low defined social scores, the presentation having the high social score may be required to occupy the majority of the electronic meeting, while the remaining presentations may each occupy a relatively small portion of the electronic meeting. However, each presenter may not be aware of how much time they will be expected to occupy (e.g., in a situation in which presentation attributes may be established 104 dynamically during the electronic meeting, and/or at a time just prior to the electronic meeting). As such a great deal of resources could potentially be wasted preparing lengthy presentations that will ultimately be reduced to a small fraction of the duration. Similarly, a presentation that is allotted the majority of the electronic meeting may not have been prepared anticipating the ultimately allotted time, and may, therefore, include insufficient material to occupy the allotted time. As in, in order to facilitate planning by the presenters, minimize wasted resources, and/or minimize un-occupied time during the electronic meeting, in some embodiments the allotted time may be established 104 based on, at least in part, and available time interval for the first presentation.

In some embodiments, establishing 104 an allotted time for the first presentation may be based on, at least in part, an available time interval for the first presentation may include identifying an available time interval for the presentation and establishing 104 an allotted time based on the available time interval and the social score for the first presentation. For example, an available time interval for each presentation may be defined based on a moderator provided time interval, a system preference, default, rule, or other mechanism. For example, a moderate may define a time interval for a presentation as being between 20 minute to 25 minutes. Presentation orchestration process 10 may establish 104 an allotted time for the first presentation based on a social score for the first presentation, in which the allotted time may be a time included in the defined time interval of 20 minutes to 25 minutes. In an embodiment in which a social score indicating a high degree of meeting participant interest is associated with the first presentation, presentation orchestration process 10 may establish 104 an allotted time of 25 minutes with the first presentation. In an embodiment in which a social score indicating a relatively low degree of meeting participant interest is associated with the first presentation, presentation orchestration process 10 may establish 104 an allotted time of 20 minutes with the first presentation. In an embodiment in which a social score indicating a moderate degree of meeting participant interest is associated with the first presentation, presentation orchestration process 10 may establish an allotted presentation time between the interval limits of 20 minutes and 25 minutes with the first presentation. It will be appreciated that the time interval of between 20 minutes to 25 minutes is intended only for the purpose of illustration and that the time interval may vary without limitation.

In an embodiment, a start time and/or a stop time may be associated with one or more of the presentations included within the electronic meeting. For example, the start time and/or the stop time for a first presentation may be based on, at least in part, an established 104 allotted presentation time for the first presentation. For example, if a 20 minute allotted presentation time is established 104 for the first presentation, then a stop time that is 20 minutes after the first presentation begins may be associated with the first presentation. In some embodiments, the stop time may be determined from the time control of the electronic meeting is transferred to the presenter of the first presentation. In other embodiment the stop time associated with the first presentation (and/or with other presentations included within the electronic meeting) may be otherwise determined.

Figure 7:
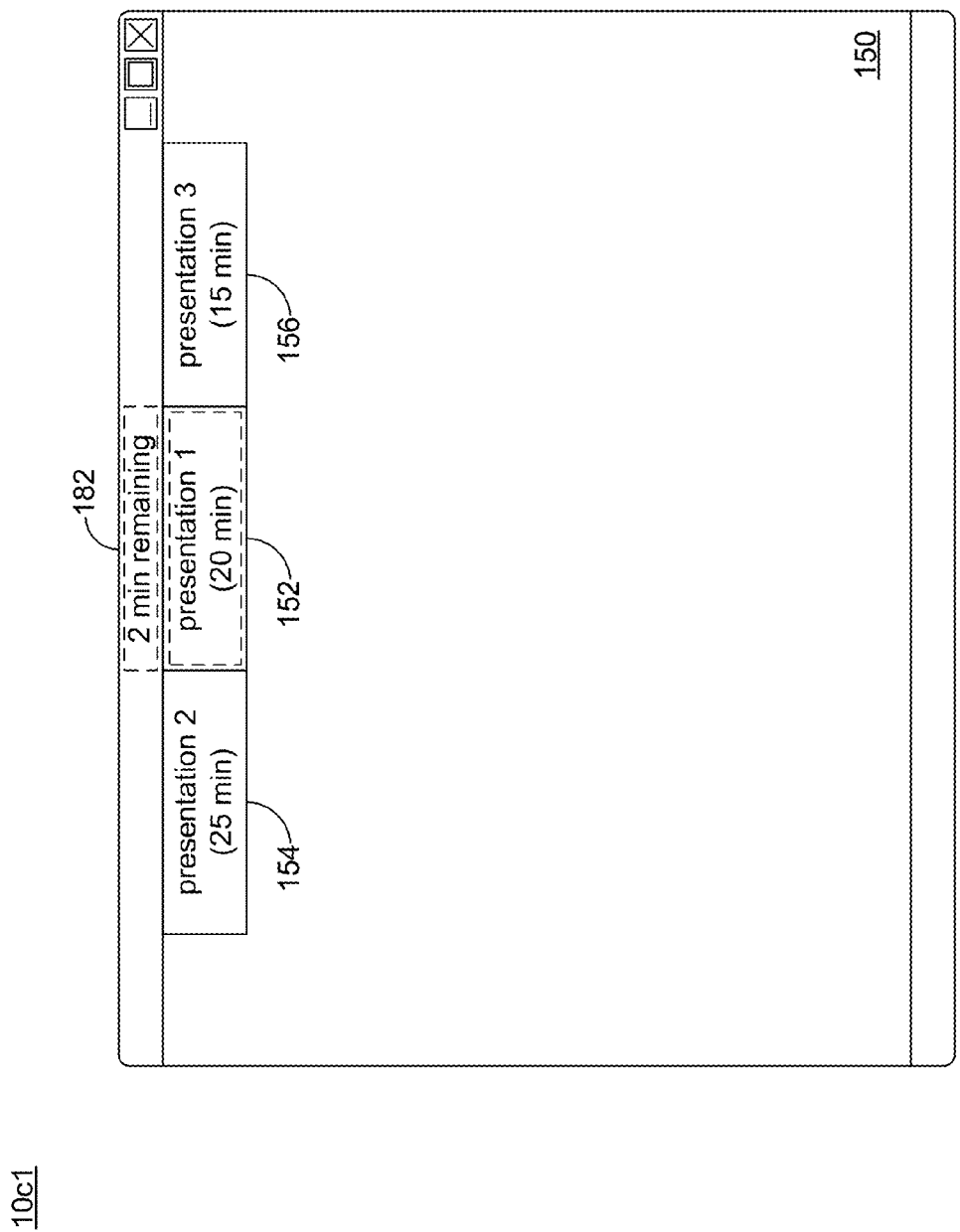
FIG. 7 is a diagrammatic representation of an example presentation orchestration process of FIG. 1, according to an implementation of the present disclosure.

Presentation orchestration process 10 may enforce 110 presentation times associated with the first presentation (and/or other presentations that may be included within the electronic meeting). In some embodiments, enforcing 110 the presentation times associated with the first presentation may include providing 112 time cues. For example, and referring also to FIG. 7, within electronic meeting user interface 150, which may include an electronic meeting user interface associated with a presenter of presentation 1 (e.g., which may include the presentation that is actively being presented within the electronic meeting), presentation orchestration process 10 may provide 112 time cue 182, e.g., which may include a visual indicator of the amount of remaining time available for presentation 1. In some embodiments, the visual time cue may only be provided 112 to the presenter of the active presentation. In other embodiments, the visual time cue may be provided to all meeting participants. It will be appreciated that various suitable time cues (both visual and audible) may be utilized for enforcing 110 the presentation times by indicating when a presentation is to start and/or end, and/or by indicating the amount of remaining time available for the presentation. In some embodiments, in addition/as an alternative to providing a time cue to a current presenter, presentation orchestration process 10 may also provide 112 a time cue to a subsequent presenter, e.g., to alert the subsequent presenter of the impending start of the next presentation. Such a time cue indicating the impending start of the next presentation may allow the next presenter to prepare to begin his presentation, thereby minimizing transition times and disruptions.

As described above, presentation orchestration process 10 may provide 112 time cues to alert a presenter of the approaching expiration of the allotted time for his presentation. As such, the presenter may be afforded the opportunity to conclude his presentation in a timely manner. However, often even when a presenter is aware of the expiration of the allotted time for the presentation, he may continue with the presentation, thereby reducing the time available for subsequent presentations and/or resulting in overruns of the scheduled electronic meeting time. In an embodiment, presentation orchestration process 10 may provide 114 strict enforcement of the allotted presentation time for the first presentation (and/or for any other presentation included within the electronic meeting). In an embodiment, providing 114 strict enforcement of the allotted presentation time for the first presentation may include terminating the first presentation at the expiration of the allotted presentation time for the first presentation and transferring control of the electronic meeting to the presenter of the next presentation. As such, the start and stop times for each presentation may be strictly enforced, e.g., which may facilitate maintaining the schedule for the electronic meeting.

In an embodiment, presentation orchestration process 10 may leverage knowledge of the allotted presentation times and/or the start and stop times associated with each of the presentation included within the electronic meeting to facilitate efficient transitions between presenters. For example, in some circumstances transitions between presenters may result in dead times, in which on one is presenting, lags between the end of one presentation and the beginning of the next presentation, technical difficulties when a presenter fails to properly relinquish control of the electronic meeting and/or the next presenter fails to properly take control of the electronic meeting. For example, as described above, the order of presentations during the electronic meeting, the allotted time for each presentation included within the electronic meeting, the start and stop time associated with each presentation included within the electronic meeting, and the identity of each presenter may be determined, e.g., based on attributes established 104 by the presentation orchestration process 10, attributes defined by the moderator of the electronic meeting, and/or otherwise established. In an embodiment, based on the knowledge of the order of the presentations, the allotted time for each presentation and the start and stop time for each presentation, at the conclusion of one presentation, presentation orchestration process 10 may terminate control of the electronic meeting by a current presenter and may transfer control of the electronic meeting by the next scheduled presenter. As such, a relatively seamless transfer of control of the electronic meeting between the previous presenter and the next presenter may be effectuated. As discussed above, in some embodiments, both the current presenter and the next presenter may be alerted to the impending conclusion of the current presentation, therefore both presenters may be prepared for the transfer of control of the electronic meeting.

In some situations, there may be a lag or latency in initially distributing slides or media components of a presentation to meeting participants, for example at the beginning of a presentation. This can often be a problem, for example, when some meeting participants are significantly geographically dispersed from a presenter and/or from a server executing the electronic meeting application (e.g., server 12 executing electronic meeting application 54), if there exist network constraints associated with some meeting participants, or the like. In an embodiment, presentation orchestration process 10 may preload one or more initial slides of an upcoming presentation on the electronic meeting server for distribution to the meeting participants and/or directly to computing devices utilized by the meeting participants. For example, a presenter of a presentation may upload presentation slides, media objects, etc., to electronic meeting application 54 prior to the beginning of the presentation. Presentation orchestration process 10 (alone and/or in combination with electronic meeting application and/or one or more other processes or applications) may distribute at least a portion of the presentation slides, media objects, etc., to computing devices utilized by meeting participants to participate in the electronic meeting. At least a portion of the presentation slides, media objects, etc., may be cached on the computing devices utilized by meeting participants to participate in the electronic meeting. As such, as soon as the presentation begins, at least the initial slides, media objects, etc., may already be resident of the computing devices associated with the meeting participants. Accordingly, the meeting participants may not experience any lag or delay in accessing the slides of the presentation. In some embodiments, all, or a portion of the presentation slides, media objects, etc., may be cached on the computing devices associated with the meeting participants prior to the beginning of the presentation. In some embodiments, only initial slide may be cached. However the initial slides that may be cached may provide sufficient lead time to allow subsequent slide to be received by the computing devices prior to such subsequent slides being required by the ongoing presentation.

Figure 8:
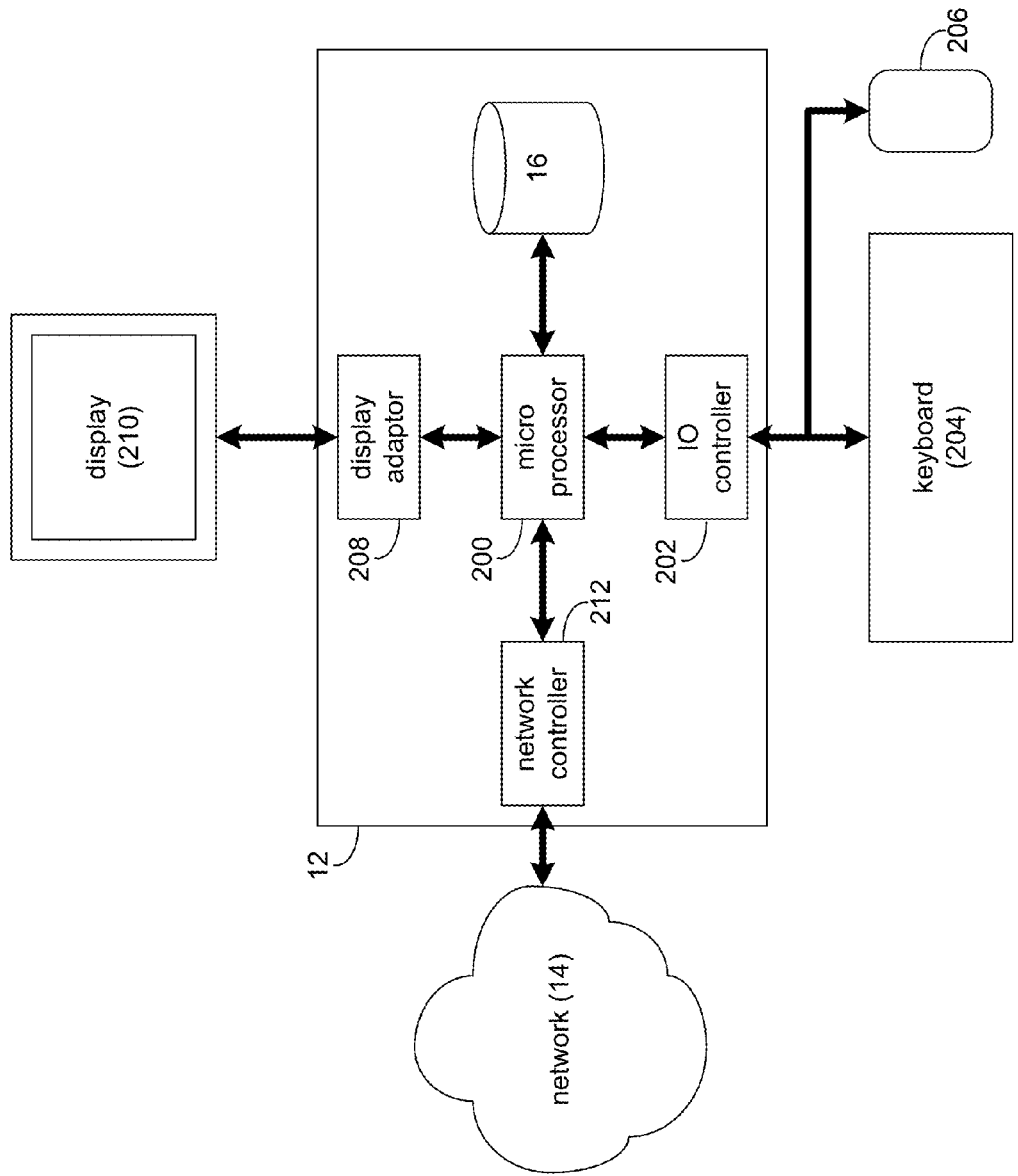
FIG. 8 is a diagrammatic view of the computing device of FIG. 1, according to an implementation of the present disclosure.

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, presentation orchestration process 10 may be substituted for computing device 12 within FIG. 8, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer program product comprising a non-transitory computer readable medium having a plurality of instructions stored thereon, which, when executed by a processor cause the processor to perform operations including:
    receiving one or more social scoring inputs associated with a plurality of presentations included within an electronic meeting;
    aggregating the one or more social scoring inputs;
    defining a social score for a first presentation of the plurality of presentations based on, at least in part, aggregating the one or more social scoring inputs;
    establishing at least one attribute of the first presentation for the electronic meeting based on the social score for the first presentation, wherein the at least one attribute of the first presentation includes a presentation order and an allotted time of the first presentation relative to at least another of the plurality of presentations within the electronic meeting, wherein the presentation order and the allotted time of the first presentation relative to the at least another of the plurality of presentations requires at least one of a threshold social score and a threshold number of received social scoring inputs, wherein the allotted time for the first presentation is dynamically established within limits of a defined time interval; and
    pre-loading at least a portion of the plurality of presentations to one or more participant computing devices based upon, at least in part, the presentation order and allotted time of the first presentation established based on the social score.

2. The computer program product of claim 1, wherein the one or more social scoring inputs are received prior to the beginning of the electronic meeting.

3. The computer program product of claim 1, wherein the one or more social scoring inputs are received during the electronic meeting.

4. The computer program product of claim 1, further including instructions for providing a presentation preview of at least a portion of the plurality of presentations, and wherein receiving the social scoring inputs is responsive to the presentation preview.

5. A computing system comprising:
   at least one processor device and at least one memory architecture coupled with the at least one processor device, the at least one processor device configured for:
   receiving one or more social scoring inputs associated with a plurality of presentations included within an electronic meeting;
   aggregating the one or more social scoring inputs;
   defining a social score for a first presentation of the plurality of presentations based on, at least in part, aggregating the one or more social scoring inputs;
   establishing at least one attribute of the first presentation for the electronic meeting based on the social score for the first presentation, wherein the at least one attribute of the first presentation includes a presentation order and an allotted time of the first presentation relative to at least another of the plurality of presentations within the electronic meeting, wherein the presentation order and the allotted time of the first presentation relative to the at least another of the plurality of presentations requires at least one of a threshold social score and a threshold number of received social scoring inputs, wherein the allotted time for the first presentation is dynamically established within limits of a defined time interval; and
   pre-loading at least a portion of the plurality of presentations to one or more participant computing devices based upon, at least in part, the presentation order and allotted time of the first presentation established based on the social score.

6. The computing system of claim 5, wherein the one or more social scoring inputs are received prior to the beginning of the electronic meeting.

7. The computing system of claim 5, wherein the one or more social scoring inputs are received during the electronic meeting.

8. The computing system of claim 5, wherein the at least one processor device is further configured for providing a presentation preview of at least a portion of the plurality of presentations, and wherein receiving the social scoring inputs is responsive to the presentation preview.

9. The computer program product of claim 2, wherein pre-loading at least a portion of the plurality of presentations includes pre-loading at least a portion of the first presentation prior to the beginning of the electronic meeting.

10. The computer program product of claim 3, wherein pre-loading at least a portion of the plurality of presentations includes pre-loading at least a portion of a second presentation prior to the end of the allotted time for the first presentation.

11. The computing system of claim 6, wherein pre-loading at least a portion of the plurality of presentations includes pre-loading at least a portion of the first presentation prior to the beginning of the electronic meeting.

12. The computing system of claim 7, wherein pre-loading at least a portion of the plurality of presentations includes pre-loading at least a portion of a second presentation prior to the end of the allotted time for the first presentation.

* * * * *